March 4, 1941.  L. E. SPRINKLE  2,234,094
IDLING DEVICE FOR ELECTRIC GENERATING PLANTS
Filed Jan. 2, 1940  3 Sheets-Sheet 1
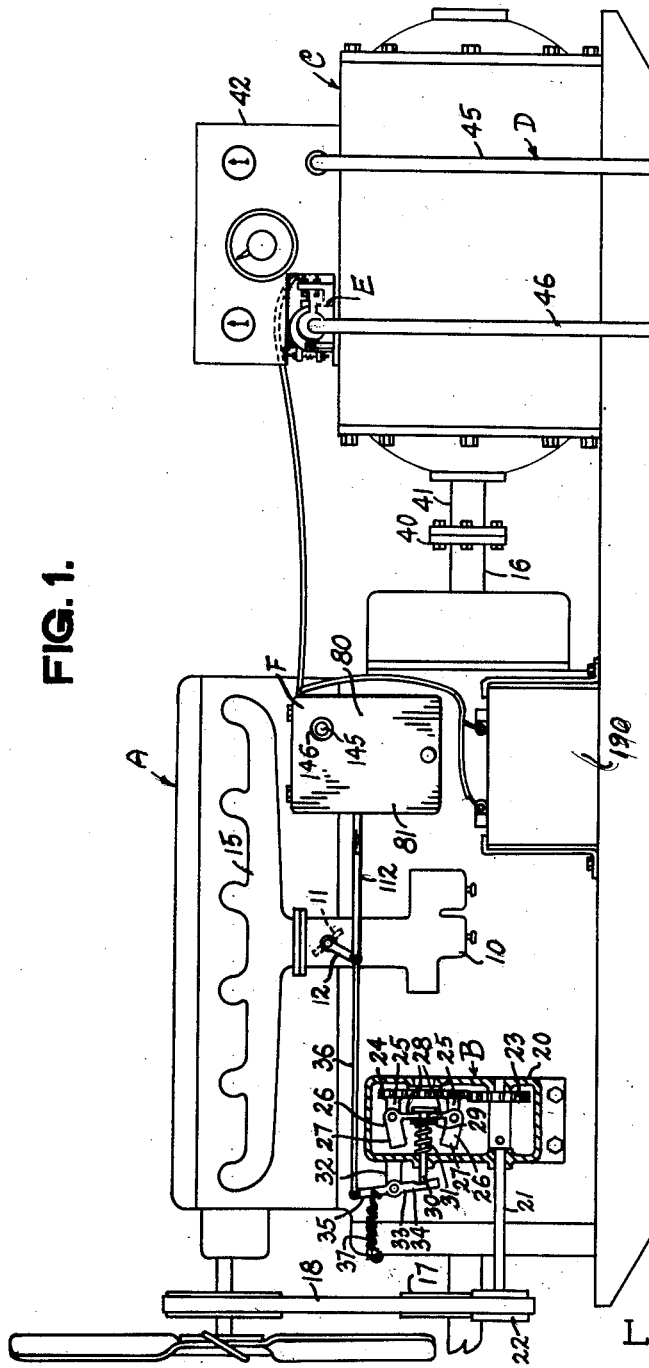
INVENTOR.
Lester E. Sprinkle
BY Lancaster, Allwine and Rommel
ATTORNEYS.

March 4, 1941.  L. E. SPRINKLE  2,234,094
IDLING DEVICE FOR ELECTRIC GENERATING PLANTS
Filed Jan. 2, 1940  3 Sheets-Sheet 2
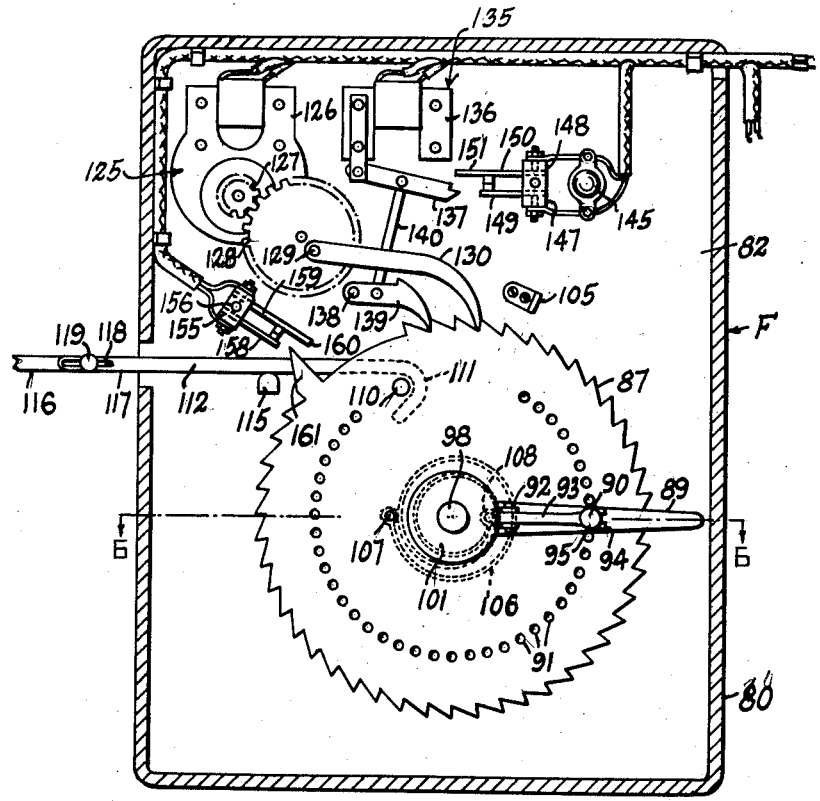
INVENTOR.
Lester E. Sprinkle
BY
ATTORNEYS.

INVENTOR.
Lester E. Sprinkle

BY Lancaster, Allwine and Rommel
ATTORNEYS.

Patented Mar. 4, 1941

2,234,094

UNITED STATES PATENT OFFICE 2,234,094

IDLING DEVICE FOR ELECTRIC GENERATING PLANTS

Lester E. Sprinkle, Milledgeville, Ill.

Application January 2, 1940, Serial No. 312,122

15 Claims. (Cl. 290—40)

The present invention relates to improvements in control apparatus particularly well adapted for use with the engine of an engine-generator supplying electric current to a welding circuit.

The primary object of the invention is to provide improved control apparatus that will tend to maintain operation of the engine of an engine-generator at a normal working speed even though fluctuations in the electrical load on the generator may occur during a substantially continuous welding operations separated by relatively short lapses, but which will automatically effect a reduction in the engine speed after a welding operation is suspended or terminated for a predetermined time interval, and which will also automatically increase the engine speed to normal substantially concurrent with a resumption of welding.

Another object of the invention is to provide control apparatus of the character described having improved means for regulating the time interval during which the welding circuit must be idle in order to effect a reduction in the normal working speed of the engine.

A further object resides in the provision of improved control apparatus of the character described including a governor for maintaining the normal working speed of the engine.

A still further object of the invention is the provision of improved control apparatus influenced by the flow of electric current in a welding cable without requiring interruption of the cable between the generator and the work for the purpose of interposing an electrical control device, such as a relay, in the welding circuit.

Yet another object of the invention is to provide an improved electrical control system for an engine-generator.

Other objects and advantages of the invention will become apparent during the course of the following detailed description, taken in connection with the accompanying drawings, forming a part of this specification, and in which drawings—

Figure 1 is a view partly in side elevation and partly in vertical section of my improved welding apparatus.

Figures 2 and 3 are views in side and end elevation, respectively, of a control switch preferably forming a part of the invention.

Fig. 4 is a vertical sectional view of a preferred form of time delay apparatus including a rotary ratchet wheel, the same being shown in a semi-advanced position, in readiness to reduce the engine speed to an idling rate.

Figure 5 is a fragmentary vertical sectional view of the structure shown in Figure 4, but with the ratchet wheel in a retracted position.

Figure 6 is a fragmentary horizontal sectional view substantially on the line 6—6 of Figure 4.

Figure 7:
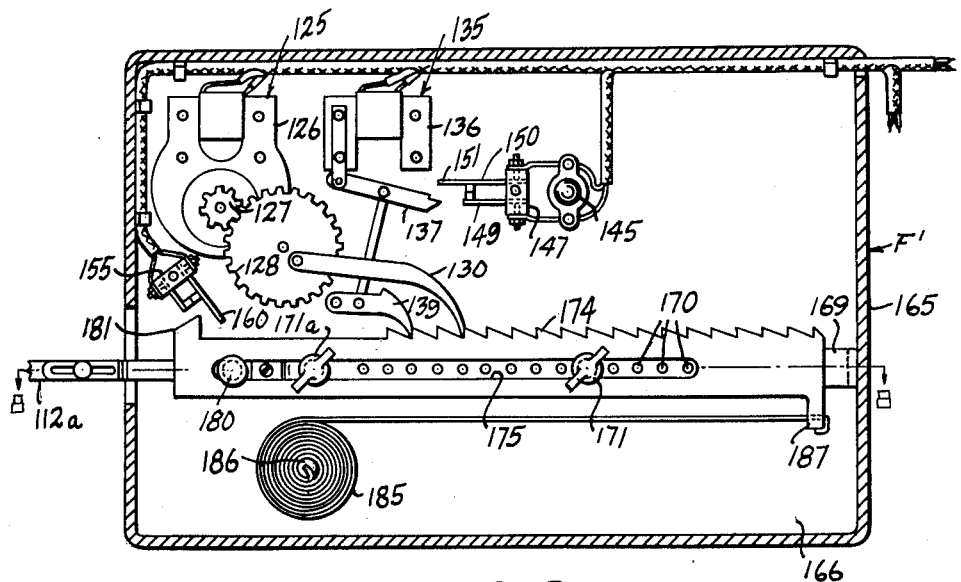
Figure 7 is a vertical sectional view of a modified form of time delay apparatus including a rectilinear ratchet bar.

In the drawings, which show preferred and modified forms of the invention, and wherein similar reference characters denote corresponding parts thruout the several views, A designates an engine provided with a governor B, and driving a generator C, supplying electric current to a welding circuit D influencing a control switch E coactible with either form of engine control apparatus F or F', to reduce the engine speed after an interval of time following discontinuance of the flow of current in the welding circuit D.

The engine A selected for the purpose of illustration includes a carburetor 10 provided with a throttle valve 11 and throttle lever 12 for regulating the flow of fuel to the engine by way of the intake manifold 15. The crankshaft 16 is provided at its forward end with a pulley 17 carrying a fan belt 18.

In the example shown, the governor B includes a housing 20 carrying a drive shaft 21 provided with a drive pulley 22 operated by the fan belt 18. Fixed on the shaft 21 within the housing 20 is a spur gear 23 meshing with a gear 24, provided with laterally extending lugs 25. Pivotally mounted on the lugs 25 are bell crank levers 26 including weighted arms 27 and thrust arms 28 engaging the annularly grooved head 29 of a plunger 30 slidably extending thru the housing 20. Encircling the plunger 30 between the housing 20 and the head 29 is an expansion coil spring 31 urging the plunger into the housing. Projecting laterally from the housing is a lug 32 pivotally carrying a lever 33 having one arm 34 in the path of travel of the plunger. The other arm 35 of the lever is connected to the throttle lever 12 as by link 36. A contractile coil spring 37 is connected to the arm 34 so as to normally urge the arm 35 into engagement with the plunger.

Connected to the rear end of the crankshaft 16, as by a coupling 40 is the armature shaft 41 of the generator C, which may be provided with a suitable panel 42.

The welding circuit D comprises a pair of cables 45, 46 extending uninterruptedly from the generator to the welding zone 47, the cable 45 being electrically connected to the work 48 at its terminal 49. The free end of the cable 46 is provided with a holder 50 for the welding rod 51.

Referring to the control switch E, the same includes a laminated base 55 providing a concave support for a section 56 of the cable 46, and a laminated armature 57 pivotally supported on the base so as to substantially encircle the cable section. In the example shown, the armature is supported by anti-friction bearings 58, each including an arm 59 fixed to and extending outwardly and upwardly from the base, a screw threaded pivot pin 60 releasably secured in transversely extending relation to the arm 59, as by a lock nut 61, and a pivot member 62 fixed to an end of the armature and receiving the pivot pin 60. Disposed intermediate the ends of the base and armature are insulative blocks 63, 64 including lug portions 65, 66. Extending between these lug portions is a contractile coil spring 67 provided at one end with a tension adjusting nut 68. The insulative block 63 of the base is provided with an upstanding portion 69 carrying a pair of vertically spaced contacts 70, 71, while the block 64 of the armature is provided with a single contact 72 movable between the contacts 70, 71 upon oscillation of the armature. By turning nut 68, the tension of the spring 67 may be adjusted in order that the armature will be slightly overbalanced whereby the single contact 72 will normally engage the uppermost contact 70. The passage of the welding current through the cable section 56 will, because of the transverse relation of the laminations 73, 74 of the base and armature to the axis of the cable section 56, create sufficient magnetic attraction between the base and armature to overcome the strength of the spring 67 and bring the contact 72 into engagement with the lowermost contact 71.

Referring now to the engine control apparatus F, shown in Figures 1 and 4–6 of the drawings, the same may be mounted in a suitable protective housing 80 provided with a hinged access plate 81. Projecting inwardly of the back plate 82 of the housing is a boss 83 rotatably supporting an axle 84, the screw 85 and washer 86 preventing inward axial movement thereof. Freely rotatable on the axle 84 is a ratchet wheel 87 with its hub portion slidably engaging the boss 83. Fixed on the axle 84, as by set screw 88, is an arm 89 provided with a transverse pin 90 depressible into locking engagement with any one of a series of intracircumferential openings 91 in the ratchet wheel. This arm 89 carries a fulcrum 92 for a lever 93 forked at its outer end 94 for engagement with the pin 90 at its annularly grooved head 95. The axle 84 is transversely slotted to accommodate the inner end 96 of the lever 93, and is bored to accommodate an expansion coil spring 97 and a push button 98, the latter being retained in the bore 99 as by a transverse pin 100 engaging with a knob 101 integral with the axle. The arrangement is such that depressing button 98 will rock lever 93 to compress the spring 97 and retract pin 90 from any one of the openings 91 in the ratchet wheel. This frees the arm 89 from the ratchet wheel so that the arm may be turned by manipulation of the knob 101 to a position wherein the pin 90, upon release of the button 98, will be projected, under the influence of the spring 97, into locking engagement with a different opening 91. Mounted on the back plate 82 extra-circumferentially of the ratchet wheel is a fixed abutment 105 disposed in the path of travel of the arm 89 so as to limit retrograde movement of the ratchet wheel in accordance with the setting of the arm 89 relative to the ratchet wheel.

Disposed between the ratchet wheel and the back plate 82, and in encircling relation to the boss 83, is a spiral spring 106 having its outer extremity connected to the ratchet wheel 87 as by pin 107, the inner extremity of the spring being connected to the back plate 82, as by a pin 108. This spring constitutes means urging the ratchet wheel to move toward a retracted position.

Fixed intramarginally of the ratchet wheel is a stud or crank pin 110 that projects beyond the rear face of the ratchet wheel. Disposed in the path of travel of the crank pin 110 is the hook end 111 of a control rod 112, the end opposite to the hook end being pivotally connected to the throttle lever 12, as shown in Figure 1. This control rod may be slidably supported adjacent its hook end as by a lug 115 on the back plate 82. In order to adjust the length of the control rod 112, the same may be formed of two sections 116, 117, the latter being longitudinally slotted at 118 and the former carrying a set screw 119 passing thru the slot 118.

Means 125 is provided to advance the ratchet wheel 87 in a clockwise direction. Secured to the back plate 82 is an electric motor 126 provided with a driving gear 127 meshing with a driven gear 128 carrying an eccentric pin 129. Pivotally mounted on the eccentric pin 129 is the shank end of a driving pawl 130 engaging the teeth of the ratchet wheel 87.

Means 135 is provided to releasably hold the ratchet wheel 87 against retrograde movement. Secured to the back plate 82 is an electro-magnet 136 preferably of the horse-shoe type, and provided with a pivotally mounted armature 137. Pivoted at 138 to the back plate is a holding pawl 139, disposed subjacent the driving pawl 130 and normally engaging the teeth of the ratchet wheel 87. Extending between the holding pawl 139 and the armature 137 is a link 140 arranged to release the holding pawl from the toothed periphery of the ratchet wheel upon movement of the armature 137 in response to attraction of the electromagnet 136.

In order to indicate the position of the armature, a pilot light 145 may be suitably mounted on the back plate 82 and a sight aperture 146 may be provided in the cover 81 of the housing. Secured to the back plate is a pilot light shunt switch 147 comprising an insulative block 148 carrying a pair of normally engaging contact arms 149—150, the latter including a portion 151 disposed in the path of travel of the armature 137, the arrangement being such that closing of the armature will open the contact arms 149—150 and remove the shunt from the pilot light 145.

The electric motor 126 is provided with an automatic cut-off switch 155 comprising an insulative block 156, secured extra-circumferentially of the ratchet wheel 87, and a pair of normally engaged contact arms 158, 159, the latter including an extension 160 disposed in the path of travel of a radial projection 161 extending from the periphery of the ratchet wheel, the arrangement being such that movement of the ratchet wheel to its advanced position will open the contact arms 158, 159, and thereby cut off the motor 126.

Figure 8:
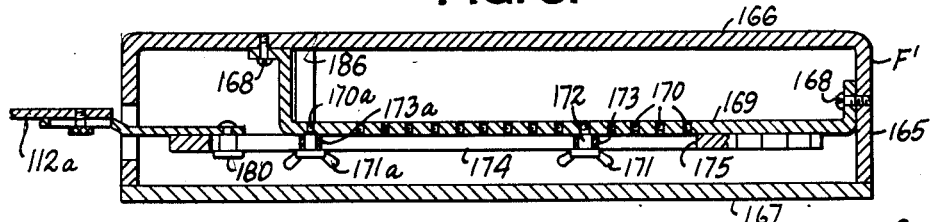
Figure 8 is a horizontal sectional view substantially on the line 8—8 of Figure 7.

As for the modified form of engine control apparatus F' shown in Figures 7 and 8 of the drawings, the same comprises a housing 165 including a back plate 166 and an access door 167. Rigidly fixed in the housing, as by cap screws 168, is an elongate strip 169 provided with a longitudinal series of screw-threaded openings 170. Removably threaded in one of the openings 170 is a winged screw 171 provided with an enlarged cylindrical body portion 172 carrying an annular roller 173. A similar winged screw 171a is threaded in an opening 170a at one end of the series of openings, this screw being provided with a roller 173a. A rectilinear ratchet bar 174 is provided with a longitudinal slot 175 wherein the rollers 173, 173a are disposed. The roller 173a serves as a support and guide for the ratchet bar 174, whereas the roller 173 not only functions as a support and guide but also as an adjustable stop for the ratchet bar 174. Removing the winged screw 171 to a different opening 170 will of course, vary the amplitude of movement of the ratchet bar. Adapted to be connected between the ratchet bar 174 and the throttle lever 12 is a control rod 112a and, in the example shown, this control rod is connected to the ratchet bar 174 by a pin 180 slidably disposed in the slot 175, and constituting a lost motion connection.

The same means 125 that serves to advance the ratchet wheel 87 may be utilized to advance the rectilinear ratchet bar 174, the motor cut-off switch 155 being automatically opened by a projection 181 preferably integral with the bar. The described means 135 is provided to releasably hold the ratchet bar 174 against retrograde movement. The pilot light 145 and shunt switch 147 are the same as those described in connection with the engine control apparatus F, shown in Figure 4.

Disposed beneath the ratchet bar 174 is a spiral spring 185 having its inner end fixed to a suitable post 186 carried by the back plate 166, the outer end of the spring being secured to a lug 187 projecting from the ratchet bar. This spring 185 constitutes means urging the ratchet bar to move toward a retracted position.

Figure 9:
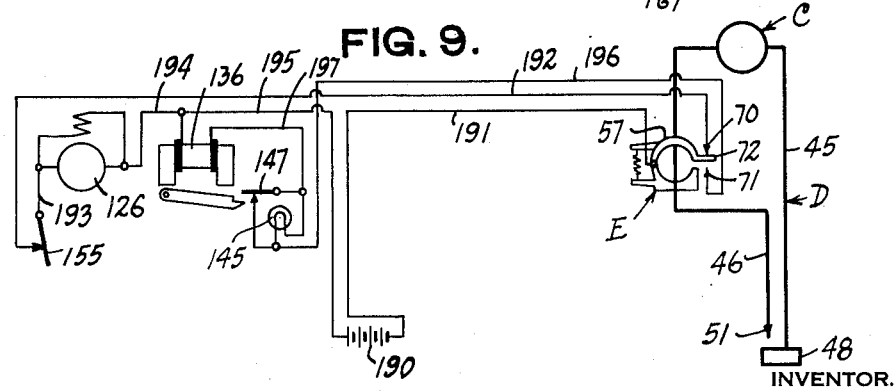
Figure 9 is a diagrammatic view of the electrical system.

Referring now to the diagram shown in Figure 9, the welding circuit D shown in heavy lines includes the conductor 45 extending between the generator C and the work 48, and the conductor 46 extending between the generator C and the welding rod 51. When the welding circuit is open, contacts 72 and 70 of the switch E are engaged, whereby to provide a circuit from the battery 190 to the motor 126 thru conductors 191, 192, switch 155, conductor 193, motor 126, and conductors 194 and 195. Operation of the motor advances the ratchet wheel of apparatus F, or the ratchet bar of apparatus F', as the case may be, to a position where the switch 155 opens to cut off the motor. Before the motor is disconnected, however, the lost motion between the ratchet wheel 7 and the control rod 112 of the apparatus F, or between the ratchet bar 174 and the control rod 112a of the apparatus F', is taken up, and the throttle lever 12 of the engine is moved to its idling position.

When the welding circuit is closed, the armature 57 of switch E will be attracted in a manner to close contacts 71 and 72, whereby to provide a circuit from the battery 190 to the electro-magnet 136, via conductors 191, 196 shunt switch 147, conductor 197, electro-magnet winding 136, and conductor 195. Energization of the electro-magnet will attract the armature 137 whereby to elevate the holding pawl 139 into engagement with the driving pawl 130, whereby to release both pawls. The shunt switch 147 will also be disconnected whereby to energize the pilot light 145. This pilot light because of its resistance will, upon energization, reduce the flow of current to an amount just sufficient to hold the armature of the electro-magnet 136 in its closed position. In the case of the apparatus F, the ratchet wheel 87 will move toward its retracted position under the influence of the spring 106, until limited by engagement of the arm 89 with the abutment 105. In the case of the apparatus F', the ratchet bar 174 will move toward its retracted position under the influence of the spring 185 until limited by engagement of the roller 173 with an end wall of the slot 175. It will therefore be seen that with the described arrangement, a temporary lapse in a welding operation will not immediately effect a reduction in speed of the engine A, because the driving pawl must first intermittently move the ratchet member 87 or 174, as the case may be, to its advanced position. It will also be seen that the time interval between discontinuance of the welding operation and the reduction of speed of the engine A may be readily varied by regulating the degree of retraction of the ratchet member.

Various changes may be made in the forms of invention herein shown and described, without departing from the spirit of the invention or the scope of the following claims.

I claim:

1. Control apparatus for an internal combustion engine driving a generator supplying current to a circuit, comprising a governor connected to the engine throttle and tending to maintain operation of the engine at a normal working speed, a control member movable between advanced and retracted positions, said control member in its retracted position having a lost motion connection to the engine throttle, said control member being movable into its advanced position to take up said lost motion and maintain operation of the engine at a reduced idling speed, and means responsive to opening and closing of the circuit to move said control member between said advanced and retracted positions.

2. Control apparatus for an internal combustion engine driving a generator for supplying current to a circuit comprising a governor connected to the throttle and tending to maintain operation of the engine at a normal working speed, a control member, a lost motion connection between the control member and the throttle for reducing the engine speed below normal upon movement of said control member into an advanced position, means urging the control member to retract from said advanced position, driving means for advancing the control member, holding means to prevent retraction of the control member, means responsive to the flow of current in said circuit to release said holding means, whereby to permit retraction of said control member, and means to actuate said driving means upon discontinuance of the flow of current in said circuit whereby to move said control member toward said advanced position.

3. Control apparatus for an internal combustion engine driving a generator for supplying current to a circuit comprising a ratchet member, a lost motion connection between the ratchet member and the engine throttle for reducing the engine speed upon movement of said ratchet member to an advanced position, means urging the ratchet member to retract from said advanced position, a motor, a driving pawl actuable by the motor for advancing the ratchet member, a holding pawl to prevent retraction of the ratchet member, an electromagnet for releasing the driving and holding pawls, a source of current, means responsive to alternate closing and opening of the circuit to alternately connect the source of current to the electromagnet and motor respectively, and means to disconnect the motor from the source of current upon movement of said ratchet member to said advanced position.

4. Control apparatus for an internal combustion engine driving a generator for supplying current to a circuit comprising a governor connected to the engine throttle to normally maintain operation of the engine at a working speed, a ratchet member, a lost motion connection between the ratchet member and the engine throttle for reducing the engine speed upon movement of said ratchet member to an advanced position, means urging the ratchet member to retract from said advanced position, a motor, a driving pawl actuable by the motor for advancing the ratchet member, a holding pawl to prevent retraction of the ratchet member, an electromagnet for releasing the driving and holding pawls, a source of current, means responsive to alternate closing and opening of the circuit to alternately connect the source of current to the electromagnet and motor respectively, and means to disconnect the motor from the source of current upon movement of said ratchet member to said advanced position.

5. Prime mover dynamo apparatus comprising a generator, an engine for driving the generator, current conducting means including an uninterrupted length of insulated cable extending between the generator and an electrical load, and means including a control device disposable in proximity to any desired portion of said length of cable and responsive to magnetic characteristics of the current flowing thru the cable for maintaining the normal speed of the engine.

6. Control apparatus for an internal combustion engine driving a generator for supplying current comprising a ratchet member, a lost motion connection between the ratchet member and the engine throttle for reducing the engine speed upon movement of said ratchet member into an advanced position, means urging the ratchet member to retract from said advanced position, adjustable stop means limiting retraction of said ratchet member beyond a predetermined degree, a driving pawl for advancing the ratchet member, a holding pawl to prevent retraction of the ratchet member, means responsive to the flow of current to release said holding and driving pawls, whereby to permit said predetermined degree of retraction of said ratchet member, and means to actuate said driving pawl upon discontinuance of the flow of welding current whereby to intermittently move said ratchet member toward said advanced position.

7. Control apparatus for an internal combustion engine driving a generator for supplying current comprising a governor connected to the engine throttle to normally maintain operation of the engine at a working speed, a ratchet member, a lost motion connection between the ratchet member and the engine throttle for reducing the engine speed upon movement of said ratchet member into an advanced position, means urging the ratchet member to retract from said advanced position, adjustable stop means limiting retraction of said ratchet member beyond a predetermined degree, a driving pawl for advancing the ratchet member, a holding pawl to prevent retraction of the ratchet member, means responsive to the flow of current to release said holding and driving pawls, whereby to permit said predetermined degree of retraction of said ratchet member, and means to actuate said driving pawl upon discontinuance of the flow of current whereby to intermittently move said ratchet member toward said advanced position.

8. Control apparatus for an internal combustion engine driving a generator for supplying current to a circuit comprising a ratchet member, a lost motion connection between the ratchet member and the engine throttle for reducing the engine speed upon movement of said ratchet member into an advanced position, means urging the ratchet member to retract from said advanced position, a driving pawl for advancing the ratchet member, a holding pawl to prevent retraction of the ratchet member, means responsive to the flow of current in said circuit to release said holding and driving pawls, whereby to permit retraction of said ratchet member, and means to actuate said driving pawl upon discontinuance of the flow of current in said circuit whereby to intermittently move said ratchet member toward said advanced position.

9. Control apparatus for an internal combustion engine driving a generator for supplying current to a circuit comprising a governor connected to the engine throttle to normally maintain operation of the engine at a working speed, a ratchet member, a lost motion connection between the ratchet member and the engine throttle for reducing the engine speed upon movement of said ratchet member into an advanced position, means urging the ratchet member to retract from said advanced position, a driving pawl for advancing the ratchet member, a holding pawl to prevent retraction of the ratchet member, means responsive to the flow of current in said circuit to release said holding and driving pawls, whereby to permit retraction of said ratchet member, and means to actuate said driving pawl upon discontinuance of the flow of current in said circuit whereby to intermittently move said ratchet member toward said advanced position.

10. Control apparatus for an internal combustion engine driving a generator for supplying current comprising a rectilinear ratchet member provided with an elongate longitudinal slot, a link between the throttle lever and said ratchet member, said link being connected to said ratchet member for sliding movement along said slot, said ratchet member being movable between advanced and retracted positions, said ratchet member in its advanced position acting on said link to reduce the engine speed for idling purposes, means urging the ratchet member to retract, a driving pawl for advancing the ratchet member, a holding pawl to prevent retraction of the ratchet member, means responsive to the flow of current in said circuit to release said holding and driving pawls, whereby to permit retraction of said ratchet member, and means to actuate said driving pawl upon discontinuance of the flow of current in said circuit whereby to intermittently move said ratchet member toward said advanced position.

11. Control apparatus for an internal combustion engine driving a generator for supplying current comprising a governor connected to the engine throttle for normally maintaining operation of the engine at a working speed, a rectilinear ratchet member provided with an elongate longitudinal slot, a link between the throttle lever and said ratchet member, said link being connected to said ratchet member for sliding movement along said slot, said ratchet member being movable between advanced and retracted positions, said ratchet member in its advanced position acting on said link to reduce the engine speed for idling purposes, means urging the ratchet member to retract, a driving pawl for advancing the ratchet member, a holding pawl to prevent retraction of the ratchet member, means responsive to the flow of current in said circuit to release said holding and driving pawls, whereby to permit retraction of said ratchet member, and means to actuate said driving pawl upon discontinuance of the flow of current in said circuit whereby to intermittently move said ratchet member toward said advanced position.

12. Control apparatus for an internal combuston engine driving a generator for supplying current to a circuit, comprising a ratchet wheel provided with a crank pin, a link between the throttle lever and said ratchet member, said link being provided with a hook disposed in the path of travel of said crank pin, said ratchet wheel being rotatable between advanced and retracted positions, and in its advanced position acting on said link, thru engagement of the crank pin with the hook, to reduce the engine speed for idling purposes, means urging the ratchet wheel to retract, a driving pawl for advancing the ratchet wheel, a holding pawl to prevent retraction of the ratchet wheel, means responsive to the flow of current in said circuit to release said holding and driving pawls, whereby to permit retraction of said ratchet wheel, and means to actuate said driving pawl upon discontinuance of the flow of current in said circuit whereby to intermittently move said ratchet member toward said advanced position.

13. Control apparatus for an internal combustion engine driving a generator for supplying current to a circuit, comprising a governor connected to the engine throttle to normally maintain operation of the engine at a working speed, a ratchet wheel provided with a crank pin, a link between the throttle lever and said ratchet member, said link being provided with a hook disposed in the path of travel of said crank pin, said ratchet wheel being rotatable between advanced and retracted positions, and in its advanced position acting on said link, thru engagement of the crank pin with the hook, to reduce the engine speed for idling purposes, means urging the ratchet wheel to retract, a driving pawl for advancing the ratchet wheel, a holding pawl to prevent retraction of the ratchet wheel, means responsive to the flow of current in said circuit to release said holding and driving pawls, whereby to permit retraction of said ratchet wheel, and means to actuate said driving pawl upon discontinuance of the flow of current in said circuit whereby to intermittently move said ratchet member toward said advanced position.

14. An idling device for electric generating plants of the character including an engine, a governor connected to the engine throttle to normally maintain operation of the engine at a working speed, and a generator driven by the engine, said device comprising a control member movable between advanced and retracted positions, a connection between the control member and the engine throttle for reducing the speed of the engine upon disposition of said control member in its advanced position, means urging said control member toward its retracted position, means to hold the control member against retraction, driving means to move the control member toward its advanced position, means responsive to loading of the generator to release said holding means, and means responsive to unloading of the generator to actuate said driving means.

15. An idling device for power plants of the character including an engine, a governor connected to the engine throttle to normally maintain operation of the engine at a working speed, and a load connectible to and disconnectible from the engine, said device comprising a control member movable between advanced and retracted positions, a lost motion connection between the control member and the engine throttle for reducing the speed of the engine upon disposition of said control member in its advanced position, driving means to move the control member toward its advanced position, means to disconnect said driving means upon the arrival of said control member in said advanced position, means urging the control member toward its retracted position, means to hold the control member against retraction, means responsive to application of said load to release said holding means, and means responsive to disconnection of said load to actuate said driving means.

LESTER E. SPRINKLE.